United States Patent
Ding et al.

(10) Patent No.: US 11,093,773 B2
(45) Date of Patent: *Aug. 17, 2021

(54) LIVENESS DETECTION METHOD, APPARATUS AND COMPUTER-READABLE STORAGE MEDIUM

(71) Applicant: Advanced New Technologies Co., Ltd., George Town (KY)

(72) Inventors: Jingting Ding, Beijing (CN); Liang Li, Beijing (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,300

(22) Filed: Jan. 29, 2020

(65) Prior Publication Data

US 2020/0167582 A1    May 28, 2020

Related U.S. Application Data

(63) Continuation of application No. 16/561,919, filed on Sep. 5, 2019.

(30) Foreign Application Priority Data

Sep. 10, 2018  (CN) .......................... 201811051838.8

(51) Int. Cl.
*G06K 9/00*        (2006.01)
(52) U.S. Cl.
CPC ..... *G06K 9/00906* (2013.01); *G06K 9/00234* (2013.01); *G06K 9/00255* (2013.01)

(58) Field of Classification Search
None
See application file for complete search history.

(56) References Cited

U.S. PATENT DOCUMENTS 7,706,674 B2 *   4/2010  Sugimoto .......... H04N 5/23219
                                                  396/61
7,856,122 B2 *  12/2010  Enomoto ............. G06K 9/6255
                                                  382/115

(Continued)

FOREIGN PATENT DOCUMENTS

| CN | 105518711 A | 4/2016 |
| CN | 106203305 A | 12/2016 |

(Continued)

OTHER PUBLICATIONS

International Search Report and Written Opinion dated Dec. 13, 2019, in counterpart International Application No. PCT/US2019/049686.

*Primary Examiner* — Feng Niu

(74) *Attorney, Agent, or Firm* — Finnegan, Henderson, Farabow, Garrett & Dunner, LLP

(57) ABSTRACT

A liveness detection method includes: controlling a display screen to display a color according to a predetermined color display sequence, the color display sequence including at least two different colors; capturing an image of a target object in a color display process of the display screen; acquiring a color change sequence of a face of the target object in the image over time; and determining whether the target object is live based on a matching relationship between the color display sequence and the color change sequence.

14 Claims, 4 Drawing Sheets

(56) References Cited

U.S. PATENT DOCUMENTS

| | | | | |
|---|---|---|---|---|
| 8,548,207 | B2* | 10/2013 | Langley | G06K 9/2027 |
| | | | | 382/115 |
| 8,611,648 | B2* | 12/2013 | Onai | G06T 7/194 |
| | | | | 382/164 |
| 9,363,517 | B2* | 6/2016 | MacInnis | H04N 19/154 |
| 9,906,817 | B2* | 2/2018 | MacInnis | H04N 19/182 |
| 9,940,532 | B2* | 4/2018 | Fan | G06K 9/00221 |
| 10,015,859 | B2* | 7/2018 | Dong | H05B 45/10 |
| 10,109,092 | B1* | 10/2018 | Hitchings, Jr. | G06T 11/60 |
| 10,169,672 | B2* | 1/2019 | Langley | G06K 9/00268 |
| 10,599,912 | B2* | 3/2020 | Benini | G06K 9/00228 |
| 10,672,049 | B1* | 6/2020 | Biggs | G06Q 30/0621 |
| 10,762,368 | B2* | 9/2020 | Lin | G06K 9/00906 |
| 2007/0230933 | A1* | 10/2007 | Sugimoto | G03B 15/03 |
| | | | | 396/61 |
| 2012/0081441 | A1* | 4/2012 | Miyake | H04N 1/4015 |
| | | | | 347/15 |
| 2013/0108152 | A1* | 5/2013 | Deng | G06F 16/5854 |
| | | | | 382/159 |
| 2014/0241630 | A1* | 8/2014 | MacInnis | H04N 19/182 |
| | | | | 382/166 |
| 2015/0347833 | A1 | 12/2015 | Robinson et al. | |
| 2017/0053174 | A1* | 2/2017 | Fan | G06K 9/00899 |
| 2018/0096212 | A1 | 4/2018 | Lin | |
| 2018/0173980 | A1 | 6/2018 | Fan et al. | |
| 2018/0181794 | A1* | 6/2018 | Benini | G06K 9/00228 |
| 2018/0211097 | A1 | 7/2018 | Wang | |
| 2018/0268233 | A1* | 9/2018 | Langley | G06K 9/2027 |
| 2020/0082192 | A1* | 3/2020 | Ding | G06K 9/2036 |

FOREIGN PATENT DOCUMENTS

| | | |
|---|---|---|
| CN | 106845438 A | 6/2017 |
| CN | 107832712 A | 3/2018 |
| CN | 107862247 A | 3/2018 |
| CN | 107992794 A | 5/2018 |
| CN | 108171205 A | 6/2018 |
| WO | WO 2016/078440 A1 | 5/2016 |

* cited by examiner

LIVENESS DETECTION METHOD, APPARATUS AND COMPUTER-READABLE STORAGE MEDIUM

CROSS-REFERENCE TO RELATED APPLICATIONS

This application is a continuation of U.S. application Ser. No. 16/561,919, filed Sep. 5, 2019, which is based upon and claims priority to Chinese Patent Application No. 201811051838.8, filed on Sep. 10, 2018, the entire content of all of which is incorporated herein by reference.

TECHNICAL FIELD

Embodiments of the specification relate to the field of computers, and in particular, to a liveness detection method, a liveness detection apparatus and a computer-readable storage medium.

TECHNICAL BACKGROUND

Currently, more and more users like to use mobile phones and other terminals to complete electronic payment. A terminal, such as a mobile phone, generally authenticates the identity of a user before making an electronic payment.

One conventional method of identity authentication is face recognition. In the process of face recognition, there are often some lawbreakers who attempt to use representations of users (for example, photos or videos of users) to impersonate users themselves for identity authentication. In such case, how to determine that the detected object is live is a technical problem to be solved.

SUMMARY

Embodiments of the specification provide a liveness detection method, a liveness detection apparatus, an electronic device, and a computer-readable storage medium to determine whether a detected object is live.

In a first aspect, a liveness detection method is provided, including: controlling a display screen to display a color according to a predetermined color display sequence, the color display sequence including at least two different colors; capturing an image of a target object in a color display process of the display screen; acquiring a color change sequence of a face of the target object in the image over time; and determining whether the target object is live based on a matching relationship between the color display sequence and the color change sequence.

In a second aspect, a liveness detection apparatus is provided, including a control module, a capturing module, an acquiring module and a determining module; wherein: the control module is configured to control a display screen to display a color according to a predetermined color display sequence, the color display sequence including at least two different colors; the capturing module is configured to capture an image of a target object in a color display process of the display screen; the acquiring module is configured to acquire a color change sequence of a face of the target object in the image over time; and the determining module is configured to determine whether the target object is live based on a matching relationship between the color display sequence and the color change sequence.

In a third aspect, an electronic device is provided, including: a processor; and a memory storing instructions executable by the processor. The processor is configured to: control a display screen to display a color according to a predetermined color display sequence, the color display sequence including at least two different colors; capture an image of a target object in a color display process of the display screen; acquire a color change sequence of a face of the target object in the image over time; and determine whether the target object is live based on a matching relationship between the color display sequence and the color change sequence.

In a fourth aspect, a computer-readable storage medium is provided, wherein the computer-readable storage medium stores instructions that, when executed by a processor of a device, cause the device to perform: controlling a display screen to display a color according to a predetermined color display sequence, the color display sequence including at least two different colors; capturing an image of a target object in a color display process of the display screen; acquiring a color change sequence of a face of the target object in the image over time; and determining whether the target object is live based on a matching relationship between the color display sequence and the color change sequence.

At least one technical solution adopted by the embodiments of the specification can achieve the following beneficial effects.

A display screen is controlled to display colors according to a color display sequence, a color change sequence of the face of a target object in a captured image is acquired, and whether the target object is live is determined based on a matching relationship between the color display sequence and the color change sequence. If the target object is not live, since the face of a target object in an image captured for a non-live object may not reflect the color change, the color display sequence may not match (for example, inconsistent with) the color change sequence in the case of a non-live object. Therefore, the liveness detection method provided by the embodiments of the specification can determine whether the detected object is live. In addition, in the liveness detection process, a user or a detected object can perform the liveness authentication in a natural manner without the user actively cooperating (for example, the user makes actions such as a nod, a blink, etc. to cooperate with the liveness detection), and thus, the liveness detection method not only can reliably detect liveness, but also can greatly reduce the operational burden of the user. Moreover, the liveness detection method does not depend on a particular terminal, and even if the image capturing device is tampered with, the liveness detection can still be performed, thereby improving the reliability of liveness detection.

DETAILED DESCRIPTION

Embodiments of the specification will be described below with reference to the accompanying drawings. The described embodiments are only examples, and not all the embodiments consistent with the specification. All other embodiments obtained by those ordinary skilled in the art based on the described embodiments without creative effort shall fall within the protection scope of the specification.

Embodiments of the specification provide a liveness detection method, a liveness detection apparatus, and a computer-readable storage medium.

The liveness detection method provided by the embodiments of the specification can detect whether the target object is live, and greatly reduce the operational burden of the user. The liveness detection method provided by the embodiments of the specification can be widely applied to various identity authentication scenarios for liveness detection, such as a money borrowing scenario, a medical treatment scenario (such as paying after medical treatment), and a ride scenario (such as a deposit-free ride), and the like.

The liveness detection method provided by the embodiments of the specification can be performed by a single electronic device such as a terminal, which may have a camera and a display screen. Examples of the electronic device include a mobile phone, a tablet computer, a palmtop computer, a desktop computer, and the like.

Figure 1:
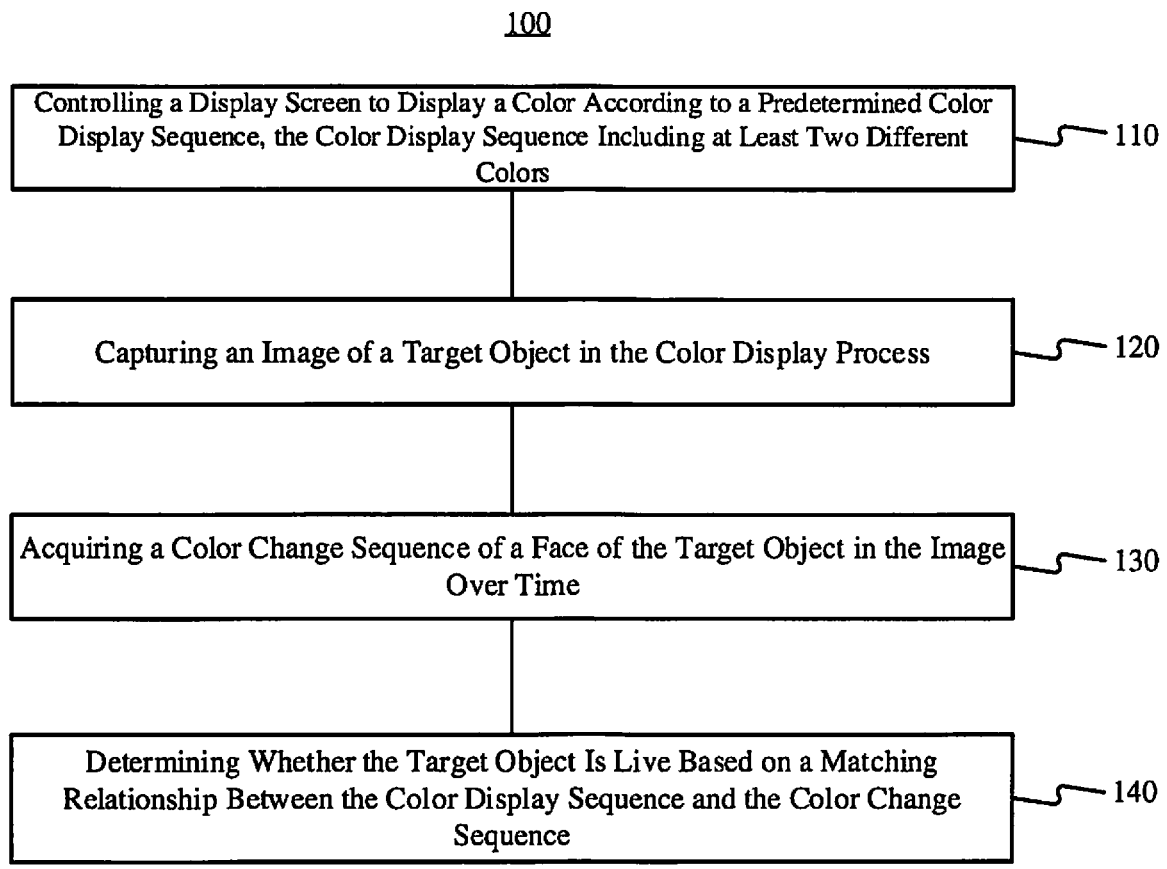
FIG. 1 is a flow chart of a liveness detection method according to an embodiment.

FIG. 1 is a flowchart of a liveness detection method 100 according to an embodiment. Referring to FIG. 1, the liveness detection method 100 can include the following steps.

In step 110, a display screen is controlled to display a color according to a predetermined color display sequence, the color display sequence including at least two different colors.

In the embodiment, the colors included in the color display sequence can be various colors. For example, the colors included in the color display sequence can be red, white, blue, and black, and for another example, the colors included in the color display sequence can be black, yellow, red, white, etc.

In the embodiment, controlling a display screen to display a color according to a predetermined color display sequence in step 110 can include: controlling the display screen to sequentially display a single color according to the predetermined color display sequence. Since single color display can simplify color display control and facilitate subsequent image analysis and color recognition, the display screen can be controlled to sequentially display a single color in some embodiments of the specification. The display screen can also be controlled to display two or more colors simultaneously. If the colors included in the color display sequence are red, white, blue, and black, and taking displaying two colors simultaneously as an example, the display screen can be controlled to display colors in an order of red-white, white-blue, and blue-black.

It is to be understood that, in the following description, reference to single color display is merely illustrative and is not intended to be limiting.

In some embodiments, the display screen can sequentially display a single color according to the order of colors indicated by the color display sequence. For example, if the colors included in the color display sequence are red, white, blue, and black, the display screen will sequentially display four colors of red, white, blue, and black.

In some embodiments, step 110 can be performed under a certain trigger condition. The triggering condition can be, for example, that a target object is located within a view finder interface of the camera and a distance between the target object and the display screen is small. For example, the distance is less than a threshold, hereinafter referred to as a first threshold. The first threshold can be set as desired. For example, the first threshold is 30 cm, 40 cm, and the like.

In the embodiments of the specification, the target object is an object to be subjected to liveness detection, such as a person, a photo of a person, a video of a person, or the like. After start of the liveness detection, the camera of the terminal can be turned on to capture an image of the target object. If an image of the target object is not captured, a prompt can be displayed on the display screen, for example, "please approach the terminal for image capturing," and a sound can be played through a speaker. If an image of the target object is captured, it can be further determined whether the distance between the target object and the display screen is less than the first threshold (e.g., 30 cm). If the distance between the target object and the display screen is not less than the first threshold, then a prompt can be displayed on the display screen, for example, "please come closer to the terminal for detection," and a sound can be played through a speaker. If the distance between the target object and the display screen is less than the first threshold, step 110 can be performed to control the display screen to display a color according to the predetermined color display sequence, such that light emitted by the display screen irradiates the face of the target object. In some embodiments, before controlling the display screen to display colors, it is first determined whether the distance between the target object and the display screen is less than the first threshold. Thus, when the distance between the target object and the display screen is relatively large, the display screen can be controlled not to display the colors for the moment since the light emitted by the display screen will probably not irradiate the face of the target object, so as to avoid invalid display of the display screen. When the distance between the target object and the display screen is relatively small, by controlling the display screen to display a color according to the predetermined color display sequence, it can be ensured that the light emitted from the display screen irradiates the face of the target object, thereby facilitating subsequent capturing of an image of the target object, and ensuring that the color display of the display screen is more targeted and effective.

In an embodiment, the controlling the display screen to sequentially display a single color according to the predetermined color display sequence can include: acquiring the predetermined color display sequence; acquiring a brightness corresponding to each color in the color display sequence; and controlling the display screen to sequentially display a single color, at a brightness corresponding to the color, in the color display sequence and in an order of colors indicated by the color display sequence. Those skilled in the art will recognize that when the display screen simultaneously displays a plurality of colors according to a color display sequence, the steps described above can also be performed for each of the plurality of colors.

In some embodiments, the electronic device is configured to communicate with a remote server. In this case, the electronic device acquiring the predetermined color display sequence can include: the electronic device receiving the predetermined color display sequence from the server. For example, the electronic device can send a color display sequence acquisition request to the server, and after receiving the color display sequence acquisition request, the server can generate a color display sequence and send the color display sequence to the electronic device via a message. In this way, the electronic device can acquire the predetermined color display sequence by receiving a message from the server. This color sequence acquisition method allows the color displayed on the display screen of the electronic device to be controlled by the server.

In some embodiments, the electronic device can also have no communication function of communicating with a remote server. I*n this case, the electronic device acquiring the predetermined color display sequence can include: the electronic device randomly generating a predetermined color display sequence. That is, in this case, the electronic device can actively generate a predetermined color display sequence without interacting with the server to obtain the color display sequence. This color sequence acquisition method can eliminate the need for the electronic device to have a communication function, thereby reducing the cost of the electronic device.

In some embodiments, two adjacent colors in the color display sequence can be colors between which a distance in a three-dimensional color space is greater than a second threshold. The three-dimensional color space can be a red, green and blue (RGB) space, each color can be represented by an RGB value in the three-dimensional color space, and the RGB value can correspond to one point in the three-dimensional color space. In this way, each color will have a corresponding point in the three-dimensional color space. For two adjacent colors in the color display sequence, the distance between the two colors can be calculated by determining the corresponding point of each of the two colors in the three-dimensional color space, and the distance is compared with a second threshold. Here, the second threshold can be set as needed.

After acquiring the predetermined color display sequence, the display screen can be controlled to display a color in the order of colors indicated by the color display sequence, for example, sequentially displaying a single color, such that light emitted by the display screen irradiates the face of the target object. The brightness corresponding to each color in the color display sequence can also be acquired, and the display screen is controlled, for example, to sequentially display a single color, at a brightness corresponding to the color, in the color display sequence and in an order of colors indicated by the color display sequence.

In order to ensure that the color superimposed on the face can be quickly determined subsequently according to the captured image of the target object, in an embodiment, acquiring a brightness corresponding to each color in the color display sequence can include: determining a brightness of an i-th color in the color display sequence, wherein i is a positive integer; based on the brightness of the i-th color, determining a brightness of an (i+1)th color in the color display sequence, such that a difference between the brightness of the i-th color and the brightness of the (i+1)th color is greater than a third threshold. In this way, the brightness of adjacent two colors is closely related, which can ensure that the captured image of the target object has a better effect, such that the color superimposed on the face can be quickly determined from the image.

In step 120, an image of a target object in the color display process is captured.

In the embodiment, in the process of the display screen of the electronic device displaying a color in the order indicated by the color display sequence (for example, sequentially displaying a single color), the camera of the electronic device can be controlled to capture an image of the target object. The captured image of the target object can be a video frame image, or can be a plurality of images (i.e., discontinuous images) taken at different time instances (time points). That is to say, an image of the target object can be taken at one time instance. When the captured image of the target object is a video frame image, the display screen of the electronic device can display a color according to the color display sequence (for example, sequentially display a single color) at the same time as the video frame image is captured. Once the display screen stops displaying, capturing of the video frame image of the target object can also be stopped accordingly. In an embodiment, a time period for capturing the video frame image can also be shorter than a time period for the display screen displaying according to the color display sequence. When the captured image of the target object is a plurality of images captured for the target object at different time instances, the target object can be photographed to acquire an image at a certain time instance in the process of the display screen of the electronic device displaying a color according to the color display sequence. Once the display screen stops displaying, the photographing of the target object can also be stopped accordingly.

In the embodiment, the video frame image can indicate that the captured image is a continuous multi-frame image.

Since the light emitted by the display screen can irradiate the face of the target object, the face of the target object in the captured image will indicate the light of a certain color if the target object is live. If the target object is not live, the face of the target object in the captured image may not indicate the light of a certain color.

In step 130, a color change sequence of a face of the target object in the image over time is acquired.

The step 130 of acquiring the color change sequence of the face of the target object in the image over time can include: analyzing a face image of the target object in the image (for example, a video frame image or a photo taken at each different time point), to acquire a color superimposed on the face; and sorting acquired colors in a chronological order to obtain a color change sequence of the face of the target object in the image over time. By analyzing the face image of the target object in the image, a color change sequence of the face of the target object in the image over time can be acquired. The acquisition of such a color change sequence is simple and fast, and the accuracy is relatively high. Taking a video frame image as an example, for one frame of image, analyzing the face image of the target object in this frame of image can obtain that the color superimposed on the face is red, and analyzing the subsequent frames of images can obtain that the colors superimposed on the face are blue and green. Accordingly, the color change sequence of the face of the target object in the image over time can be acquired as red, blue, and green.

In step 140, it is determined whether the target object is live based on a matching relationship between the color display sequence and the color change sequence.

The matching relationship in the embodiment can include matching and not matching, wherein the matching criteria can be determined as needed. For example, if the color display sequence is exactly the same as the color change sequence, then it can be determined that the color display sequence matches the color change sequence; otherwise, the color display sequence does not match the color change sequence. As another example, the criteria for matching can be determined based on a threshold. For example, if a same portion of the color display sequence and the color change sequence exceeds a preset percentage (e.g., 80% or 90%), then it can be determined that the color display sequence matches the color change sequence; otherwise, the color display sequence does not match the color change sequence.

If the color display sequence matches (e.g., is consistent with) the color change sequence, the target object can be determined to be live; if the color display sequence does not match (for example, is inconsistent with) the color change sequence, it can be determined that the target object is not live. For example, if the color display sequence is red, white, blue, and black, and the color change sequence is red, white, blue, and black, it can be determined that the color display sequence is consistent with the color change sequence, thereby determining that the target object is live. For another example, if the color display sequence is red, white, blue, and black, and the color change sequence is red, blue, black, and white, it can be determined that the color display sequence is inconsistent with the color change sequence, thereby determining that the target object is not live. Examples of non-live objects can be pictures, videos, and the like.

In the embodiment, whether the target object is live can be determined by comparing whether the color display sequence matches the color change sequence. In some embodiments, when the color display sequence matches the color change sequence, instead of directly determining that the target object is live, image analysis can be performed to further determine whether the target object is live. In an embodiment, if the color display sequence matches the color change sequence, it may be further determined whether the face image of the target object in the image (e.g., a video frame image or a photo taken at each different time point) conforms to a three-dimensional reflection characteristic. If the face image of the target object in the image conforms to a three-dimensional reflection characteristic, it is determined that the target object is live. If the face of the target object in the image does not conform to the three-dimensional reflection characteristic, for example, the face image of the target object in the image being an image of partially specular reflection, it can be determined that the target object is not live. In the embodiments, due to the shape and skin characteristics of the face, the reflection characteristics of the light on the face can include: first, the diffuse reflection characteristic of the facial skin to the light, such that the reflected color light is uniformly distributed on most area of the face; and second, since the face is a three-dimensional shape, there will be shadows due to occlusion in some partial areas of the face (such as around the bridge of the nose). Thus, in determining whether the face image of the target object in the image (for example, a video frame image or a photo taken at each different time point) conforms to the three-dimensional reflection characteristic, if the color of the image in most areas of the face is evenly distributed, while there is a shadow around a specific part (such as the bridge of the nose), it can be determined that the face image of the target object in the image conforms to the three-dimensional reflection characteristic. On the contrary, if the color of the image of most parts of the face is not evenly distributed, or there is no shadow around a specific part (such as the bridge of the nose), it can be determined that the face image of the target object in the image does not conform to the three-dimensional reflection characteristic.

The liveness detection method provided by the embodiments of the specification controls the display screen to display colors in an order of a color display sequence, acquires a color change sequence of the face of the target object in the captured image, and determines whether the target object is live based on a matching relationship between the color display sequence and the color change sequence. If the target object is not live, since the face of a target object in an image captured for a non-live object may not reflect the color change, the color display sequence may not be consistent with the color change sequence in the case of a non-live object. Therefore, the liveness detection method provided by the embodiments of the specification can determine whether the detected object is live. In addition, in the liveness detection process, the user and the detected object can perform the liveness authentication in a natural manner without the user actively cooperating (for example, the user makes actions such as a nod, a blink, etc. to cooperate with the liveness detection), and thus, the liveness detection method not only can reliably detect liveness, but also can greatly reduce the operational burden of the user.

Moreover, the liveness detection method provided by the embodiments of the specification does not depend on one particular image capturing device, and even if the image capturing device is tampered with, the liveness detection can still be performed, thereby improving the reliability of liveness detection.

Figure 2:
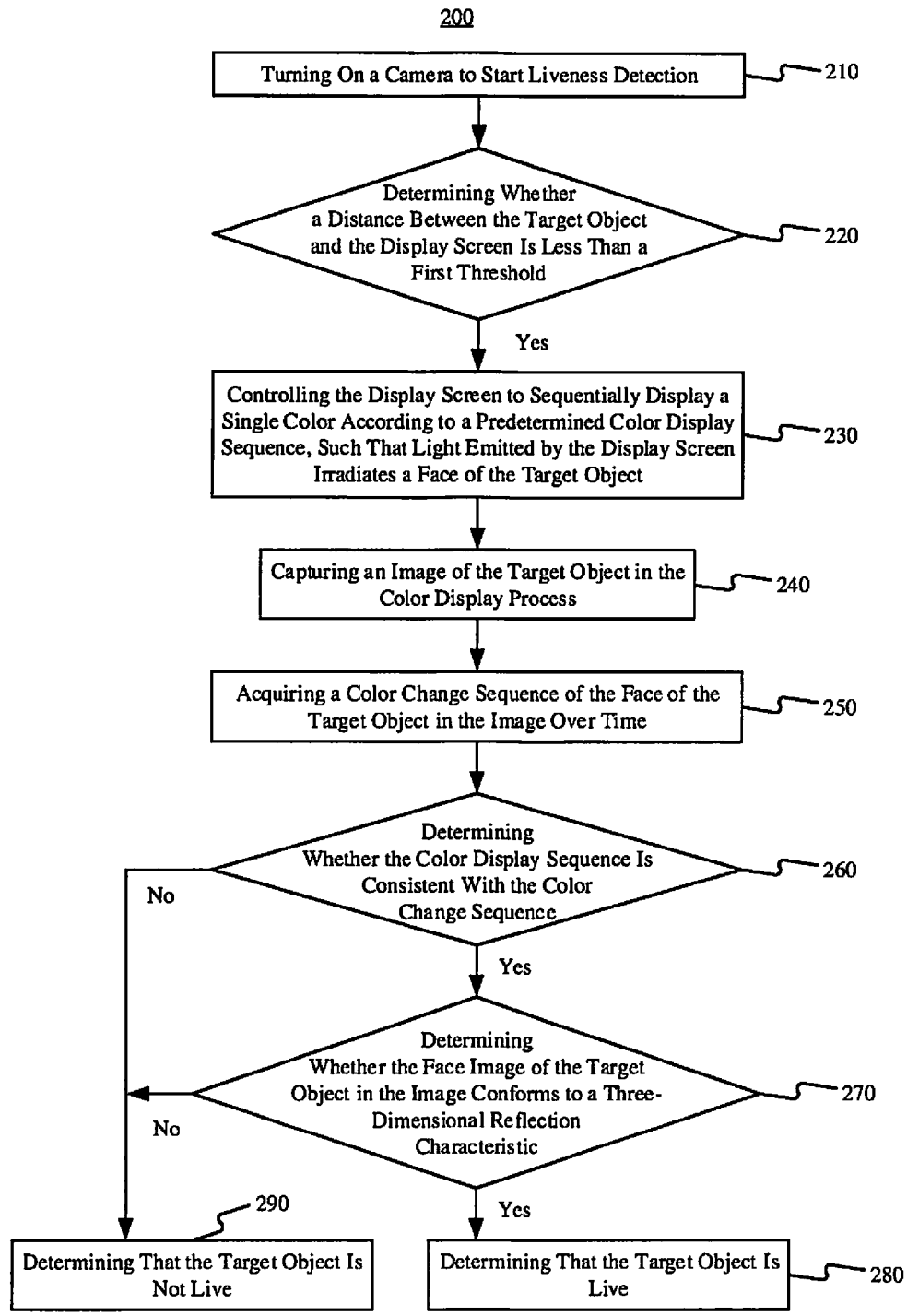
FIG. 2 is a flow chart of another liveness detection method according to an embodiment.

FIG. 2 is a flow chart of a liveness detection method 200 according to an embodiment. It should be understood that FIG. 2 only illustrates an example in which the display screen sequentially displays a single color according to a predetermined color display sequence. It should also be understood that the foregoing description can be referred to for the relevant content of the steps described in FIG. 2. Referring to FIG. 2, the liveness detection method 200 can include the following steps.

In step 210, a camera is turned on to start liveness detection.

This step can be performed when a triggering operation is received, for example, when the terminal display prompts "whether to initiate authentication," and the user clicks the "yes" option. The embodiment does not limit the operation for triggering the execution of step 210. The triggering operation can be a click operation, a double-click operation, or an operation of drawing a specified graph.

Once the camera is turned on, an image of the target object can be captured. If the image of the target object is not captured, a prompt can be displayed on the display screen, for example, "please approach the terminal for image capturing" and a sound can be played through the speaker. If an image of the target object is captured, it can be further determined a distance between the target object and the display screen.

In step 220, it is determined whether a distance between the target object and the display screen is less than a first threshold.

The first threshold can be selected as needed. For example, the first threshold is 30 cm or 40 cm.

In step 230, when the distance between the target object and the display screen is less than the first threshold, the display screen is controlled to sequentially display a single color according to a predetermined color display sequence, such that light emitted by the display screen irradiates a face of the target object.

The controlling the display screen to sequentially display a single color according to the predetermined color display sequence can include: acquiring the predetermined color display sequence; acquiring a brightness corresponding to each color in the color display sequence; and controlling the display screen to sequentially display a single color, at a brightness corresponding to the color, in the color display sequence and in an order of colors indicated by the color display sequence.

The acquiring the predetermined color display sequence can include: receiving the predetermined color display sequence from the server; or randomly generating the predetermined color display sequence. In an embodiment, two adjacent colors in the color display sequence can be colors between which a distance in a three-dimensional color space is greater than a second threshold.

The acquiring a brightness corresponding to each color in the color display sequence can include: determining a brightness of an i-th color in the color display sequence, where i is a positive integer; and determining a brightness of an (i+1)th color in the color display sequence, such that a difference between the brightness of the i-th color and the brightness of the (i+1)th color is greater than a third threshold.

In step 240, in the color display process, an image of the target object is captured.

In an embodiment, the image captured for the target object can be a video frame image or can be a photo taken at each different time point.

In step 250, a color change sequence of the face of the target object in the image over time is acquired.

The step 250 of acquiring the color change sequence of the face of the target object in the image over time can include: analyzing a face image of the target object in the image to acquire a color superimposed on the face; and sorting acquired colors in a chronological order to obtain a color change sequence of the face of the target object in the image over time.

In step 260, it is determined whether the color display sequence is consistent with the color change sequence. If it is consistent, step 270 is performed; and if it is not consistent, step 290 is performed.

In step 270, if the color display sequence is consistent with the color change sequence, it is determined whether the face image of the target object in the image conforms to a three-dimensional reflection characteristic.

If the face image of the target object in the image conforms to the three-dimensional reflection characteristic, step 280 is performed; if the face of the target object in the image does not conform to the three-dimensional reflection characteristic, step 290 is performed.

In step 280, it is determined that the target object is live.

In step 290, it is determined that the target object is not live.

The liveness detection method provided by the embodiments of the specification controls the display screen to display colors in an order of a color display sequence, acquires a color change sequence of the face of the target object in the captured image, and determines that the target object is live when the color display sequence is consistent with the color change sequence. In the process, the user or the detected object can perform the liveness authentication in a natural manner without the user actively making actions such as a nod, a blink, etc. to cooperate with the liveness detection, and thus, the liveness detection method not only can reliably detect liveness, but also can greatly reduce the operational burden of the user to actively cooperate.

Moreover, the liveness detection method does not depend on one particular terminal, and even if the image capturing device is tampered with, the liveness detection can still be performed, thereby improving the reliability of liveness detection.

It should be understood by those skilled in the art that two adjacent colors in the color display sequence can be colors between which a distance in a three-dimensional color space is greater than a second threshold. In an embodiment, the color display sequence can only include black and white, wherein black and white in the color display sequence can be alternately set. In this way, it can also realize light emitted by the display screen irradiating the face of the target object. Subsequently, in the process of determining whether the target object is live, the order in which the colors are displayed on the display screen can be compared with the order of colors of the face of the target object in the image (for example, a video frame image or a photo taken at each different time point) change. If they are consistent, the target object can be determined to be live. In some embodiments, when the order in which the colors are displayed on the display screen matches the change order of colors of the face of the target object in the image, instead of directly determining that the target object is live, it is further determined whether the face image of the target object in the image conforms to a three-dimensional reflection characteristic. If the face image of the target object in the image conforms to the three-dimensional reflection characteristic, it is determined that the target object is live. If the face image of the target object in the image does not conform to the three-dimensional reflection characteristic, it is determined that the target object is not live.

Figure 3:
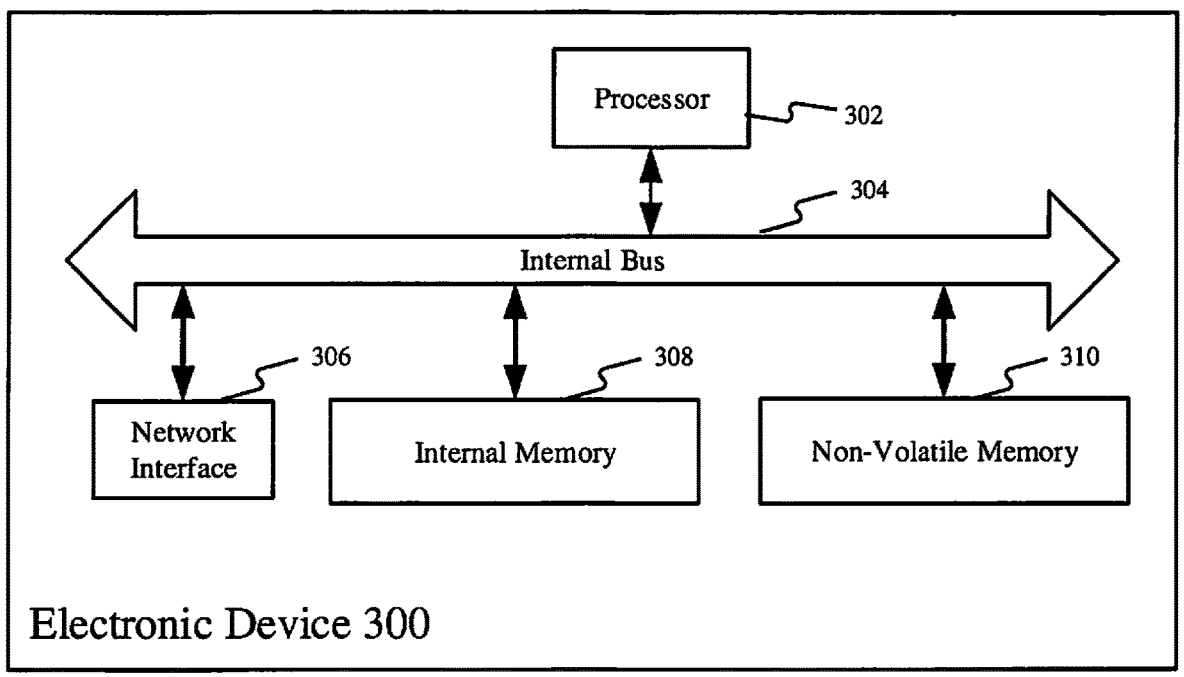
FIG. 3 is a schematic diagram of an electronic device according to an embodiment.

FIG. 3 is a schematic diagram of an electronic device 300 according to an embodiment. Referring to FIG. 3, the electronic device 300 may include a processor 302, an internal bus 304, a network interface 306, and a memory. The memory can include an internal memory 308, such as a high-speed Random Access Memory (RAM), and can also include a non-volatile memory 310, such as at least one disk memory. The electronic device 300 can also include hardware required for other services.

The processor 302, the network interface 306, and the memory 308 and 310 can be interconnected by the internal bus 304, which can be an ISA (Industry Standard Architecture) bus, a PCI (Peripheral Component Interconnect) bus, or an EISA (Extended Industry Standard Architecture) bus. The bus 304 can be an address bus, a data bus, a control bus, and the like. For ease of representation, only one double-headed arrow is shown in FIG. 3, but it does not mean that there is only one bus or one type of buses.

The memory is configured to store programs. For example, the program can include program codes, the program codes including computer operating instructions. The memory can include the internal memory 308 and the non-volatile memory 310 and provides instructions and data to the processor 302.

The processor 302 is configured to read the corresponding computer program from the non-volatile memory 310 into the internal memory 308 and then runs the computer program. The processor 302 executes a program stored in the memory and can perform any of the liveness detection methods described above. For example, the processor 302 can be configured to control the display screen to display a color according to a predetermined color display sequence, the color display sequence including at least two different colors; capture an image of the target object in the color display process; acquire a color change sequence of a face of the target object in the image over time; and determine whether the target object is live based on a matching relationship between the color display sequence and the color change sequence.

The processor 302 can be an integrated circuit chip with signal processing capabilities. In the implementation process, each step of the above described method can be completed by an integrated logic circuit in the processor 302 or an instruction in a form of software. The processor 302 can be a general-purpose processor, including a Central Processing Unit (CPU), a Network Processor (NP), etc.; or can be a Digital Signal Processor (DSP), an Application Specific Integrated Circuit (ASIC), a Field-Programmable Gate Array (FPGA) or other programmable logic device, discrete gate or transistor logic device, and discrete hardware component. The general-purpose processor can be a microprocessor or any conventional processor or the like. The steps of the method described above can be directly implemented by a hardware decoding processor, or can be performed by a combination of hardware and software modules in the decoding processor. The software module can be located in a conventional storage medium such as a random access memory, a flash memory, a read only memory, a programmable read only memory or an electrically erasable programmable memory, a register, and the like. The storage medium is located in the memory, and the processor reads the information in the memory and combines the hardware to complete the steps of the above method.

An embodiment of the specification further provides a computer-readable storage medium storing one or more programs, the one or more programs including instructions that, when being executed by an electronic device, cause the electronic device to perform the above described methods including, for example, controlling the display screen to display a color according to a predetermined color display sequence, the color display sequence including at least two different colors; capturing an image of the target object in the color display process; acquiring a color change sequence of a face of the target object in the image over time; and determining whether the target object is live based on a matching relationship between the color display sequence and the color change sequence.

The computer-readable storage medium can be a non-transitory computer-readable storage medium. The computer-readable storage medium may be, for example, a Read-Only Memory (ROM), a Random Access Memory (RAM), a magnetic disk, or an optical disk, and the like.

The electronic device and the computer-readable storage medium provided by the embodiments of the specification control the display screen to display colors in an order of a color display sequence, acquire a color change sequence of the face of the target object in the captured image, and determine whether the target object is live based on a matching relationship between the color display sequence and the color change sequence. If the target object is not live, since the face of a target object in an image captured for a non-live object may not reflect the color change, the color display sequence may not be consistent with the color change sequence in the case of a non-live object. Therefore, the liveness detection method provided by the embodiments of the specification can determine whether the detected object is live. In addition, in the liveness detection process, a user or a detected object can perform the liveness authentication in a natural manner without the user actively cooperating (for example, the user makes actions such as a nod, a blink, etc. to cooperate with the liveness detection), and thus, the liveness detection method not only can reliably detect liveness, but also can greatly reduce the operational burden of the user.

Moreover, the liveness detection method does not depend on one particular terminal, and even if the image capturing device is tampered with, the liveness detection can still be performed, thereby improving the reliability of liveness detection.

Figure 4:
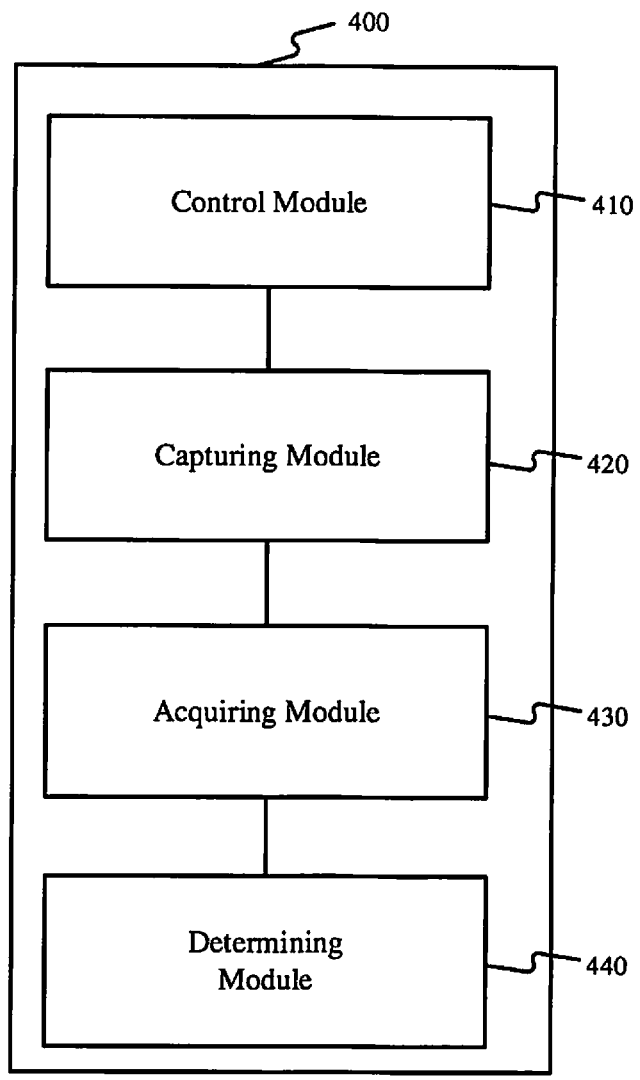
FIG. 4 is a block diagram of a liveness detection apparatus according to an embodiment.

FIG. 4 is a block diagram of a liveness detection apparatus 400 according to an embodiment. Referring to FIG. 4, the liveness detection apparatus 400 can include: a control module 410, a capturing module 420, an acquiring module 430, and a determining module 440.

The control module 410 controls the display screen to display a color according to a predetermined color display sequence, the color display sequence including at least two different colors; the capturing module 420 captures an image of a target object in the color display process; the acquiring module 430 acquires a color change sequence of a face of the target object in the image captured by the capturing module 420 over time; and the determining module 440 determines whether the target object is live based on a matching relationship between the color display sequence and the color change sequence acquired by the acquiring module 430.

The liveness detection apparatus 400 controls the display screen to display colors in an order of a color display sequence, acquires a color change sequence of the face of the target object in the captured image, and determines whether the target object is live based on a matching relationship between the color display sequence and the color change sequence. If the target object is not live, since the face of a target object in an image captured for a non-live object may not reflect the color change, the color display sequence may not be consistent with the color change sequence in the case of a non-live object. Therefore, the liveness detection apparatus 400 can determine whether the detected object is live. In addition, in the liveness detection process, a user or a detected object can perform the liveness authentication in a natural manner without the user actively cooperating (for example, the user makes actions such as a nod, a blink, etc. to cooperate with the liveness detection), and thus, the liveness detection apparatus 400 not only can detect liveness, but also can greatly reduce the operational burden of the user.

Moreover, the liveness detection method does not depend on one particular terminal, and even if the image capturing device is tampered with, the liveness detection can still be performed, thereby improving the reliability of liveness detection.

In an embodiment, the determining module 440 is configured to: if the color display sequence matches the color change sequence, determine that the target object is live; and if the color display sequence does not match the color change sequence, determine that the target object is not live.

In an embodiment, if the color display sequence matches the color change sequence, the determining module 440 does not directly determine that the target object is live, but can further determine whether the face image of the target object conforms to the three-dimensional reflection characteristic; and if so, it is determined that the target object is live.

In an embodiment, the control module 410 can be configured to: control the display screen to sequentially display a single color according to a predetermined color display sequence.

In an embodiment, before the control module 410 controls the display screen to sequentially display a single color according to a predetermined color display sequence, the determining module 440 can be configured to: determine whether a distance between the target object and the display screen is less than a first threshold.

Correspondingly, the control module 410 is configured to: when the distance between the target object and the display screen is less than the first threshold, control the display screen to sequentially display a single color according to a predetermined color display sequence, such that the light emitted by the display screen irradiates the face of the target object.

In an embodiment, the control module 410 can be configured to: acquire a predetermined color display sequence; acquire a brightness corresponding to each color in the color display sequence; control the display screen to sequentially display a single color, at a brightness corresponding to the color, in the color display sequence and in an order of colors indicated by the color display sequence.

In an embodiment, when acquiring the brightness corresponding to each color in the color display sequence, the control module 410 can be configured to: determine the brightness of an i-th color in the color display sequence, wherein i is a positive integer; and determine a brightness of an (i+1)th color in the color display sequence, such that a difference between the brightness of the i-th color and the brightness of the (i+1)th color is greater than a third threshold.

In an embodiment, two adjacent colors in the color display sequence can be colors between which a distance in a three-dimensional color space is greater than a second threshold.

In an embodiment, the colors included in the color display sequence can be black and white.

In an embodiment, when acquiring a color change sequence of the face of the target object in the image over time, the acquiring module 430 can be configured to: analyze a face image of the target object in the image to acquire a color superimposed on the face; and sort acquired colors in a chronological order to obtain a color change sequence of the face of the target object in the image over time.

In an embodiment, when acquiring a predetermined color display sequence, the control module 410 can be configured to: receive the predetermined color display sequence from the server; or randomly generate the predetermined color display sequence.

Each of the above described modules may be implemented as software, or hardware, or a combination of software and hardware. For example, each of the above described modules may be implemented using a processor executing instructions stored in a memory. Also, for example, each of the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

The apparatus, module or unit set forth in the above embodiments can be implemented by a computer chip or an entity, or by a product having a certain function. A typical implementation device is a computer. The computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

The computer-readable medium includes permanent and non-permanent, removable and non-removable media. Information storage can be implemented by any method or technology. The information can be computer-readable instructions, data structures, modules of programs, or other data. Examples of computer storage media include, but are not limited to, a phase change memory (PRAM), a static random access memory (SRAM), a dynamic random access memory (DRAM), other types of random access memories (RAMS), a read only memory (ROM), an electrically erasable programmable read only memory (EEPROM), a flash memory or other memory technology, a compact disk read only memory (CD-ROM), a digital versatile disk (DVD) or other optical storage, a cassette-type magnetic tape, a magnetic disc storage or other magnetic storage device or any other non-transportable media, which can be used to store information that can be accessed by a computing device. The computer-readable media do not include computer-readable transitory media, such as modulated data signals and carrier waves.

It is also to be understood that the terms "include" or "comprise" or any other variations are intended to encompass a non-exclusive inclusion, such that a process, a method, an article, or a device comprising a series of elements not only comprises such elements, but also comprises other elements not explicitly listed, or can comprise elements inherent to such process, method, article, or device. An element defined by a phrase "including a . . . " without further limitation does not exclude the existence of additional identical elements in the process, the method, the article, or the device that includes the element.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A liveness detection method, comprising:
controlling a display screen to display a color according to a color display sequence, the color display sequence being predetermined and including at least two different colors;
capturing an image of a target object in a color display process of the display screen;
acquiring a color change sequence of a face of the target object in the image over time; and
determining whether the target object is live based on a matching relationship between the color display sequence and the color change sequence, wherein when a portion of the color display sequence and a corresponding portion of the color change sequence are determined to include a same color sequence and a number of colors in the same color sequence compared to a number of colors in the color change sequence exceeds a preset percentage, it is determined that the color display sequence matches the color change sequence,
wherein controlling the display screen to display the color according to the color display sequence comprises:
acquiring the color display sequence;
acquiring a brightness corresponding to each color in the color display sequence; and
controlling the display screen to sequentially display a single color, at a brightness corresponding to the color, in the color display sequence and in an order of colors indicated by the color display sequence, a distance between two adjacent colors in the color display sequence in a three-dimensional color space being greater than a preset threshold.

2. The method according to claim 1, wherein determining whether the target object is live based on a matching relationship between the color display sequence and the color change sequence comprises:
if the color display sequence matches the color change sequence, determining that the target object is live; and
if the color display sequence does not match the color change sequence, determining that the target object is not live.

3. The method according to claim 2, wherein if the color display sequence matches the color change sequence, determining that the target object is live comprises:

if the color display sequence matches the color change sequence, determining whether the face of the target object in the image conforms to a three-dimensional color reflection characteristic; and if it is determined that the face of the target object in the image conforms to the three-dimensional color reflection characteristic, determining that the target object is live.

4. The method according to claim 1, wherein before controlling the display screen to sequentially display a single color, the method further comprises:

determining whether a distance between the target object and the display screen is less than a second preset threshold; and controlling the display screen to sequentially display a single color further comprises: when the distance between the target object and the display screen is less than the second preset threshold, controlling the display screen to sequentially display a single color according to the color display sequence, such that light emitted by the display screen irradiates the face of the target object.

5. The method according to claim 1, wherein acquiring a brightness corresponding to each color in the color display sequence comprises:

determining a brightness of an i-th color in the color display sequence, wherein i is a positive integer; and determining a brightness of an (i+1)th color in the color display sequence based on the brightness of the i-th color, such that a difference between the brightness of the i-th color and the brightness of the (i+1)th color is greater than a second preset threshold.

6. The method according to claim 1, wherein the color display sequence comprises colors of black and white.

7. The method according to claim 1, wherein acquiring a color change sequence of a face of the target object in the image over time comprises:

analyzing a face image of the target object in the image to acquire a color superimposed on the face; and sorting acquired colors in a chronological order to obtain the color change sequence of the face of the target object in the image over time.

8. The method according to claim 1, wherein acquiring the color display sequence comprises one of:

receiving the color display sequence from a server; or
randomly generating the color display sequence.

9. An electronic device, comprising:
a processor; and
a memory storing instructions executable by the processor,
wherein the processor is configured to:
control a display screen to display a color according to a color display sequence, the color display sequence being predetermined and including at least two different colors;
capture an image of a target object in a color display process of the display screen;
acquire a color change sequence of a face of the target object in the image over time; and
determine whether the target object is live based on a matching relationship between the color display sequence and the color change sequence, wherein when a portion of the color display sequence and a corresponding portion of the color change sequence are determined to include a same color sequence and a number of colors in the same color sequence compared to a number of colors in the color change sequence exceeds a preset percentage, it is determined that the color display sequence matches the color change sequence, wherein in controlling the display screen to display the color according to the color display sequence, the processor is further configured to:
acquire the color display sequence;
acquire a brightness corresponding to each color in the color display sequence; and
control the display screen to sequentially display a single color, at a brightness corresponding to the color, in the color display sequence and in an order of colors indicated by the color display sequence, a distance between two adjacent colors in the color display sequence in a three-dimensional color space being greater than a preset threshold.

10. The electronic device according to claim 9, wherein the processor is further configured to:

if the color display sequence matches the color change sequence, determine that the target object is live; and if the color display sequence does not match the color change sequence, determine that the target object is not live.

11. The electronic device according to claim 10, wherein the processor is further configured to:

if the color display sequence matches the color change sequence, determine whether the face of the target object in the image conforms to a three-dimensional color reflection characteristic; and if it is determined that the face of the target object in the image conforms to the three-dimensional color reflection characteristic, determine that the target object is live.

12. The electronic device according to claim 9, wherein the processor is further configured to:

determine whether a distance between the target object and the display screen is less than a second preset threshold; and when the distance between the target object and the display screen is less than the second preset threshold, control the display screen to sequentially display a single color according to the color display sequence, such that light emitted by the display screen irradiates the face of the target object.

13. The electronic device according to claim 9, wherein the processor is further configured to:

determine a brightness of an i-th color in the color display sequence, wherein i is a positive integer; and determine a brightness of an (i+1)th color in the color display sequence based on the brightness of the i-th color, such that a difference between the brightness of the i-th color and the brightness of the (i+1)th color is greater than a second preset threshold.

14. A non-transitory computer-readable storage medium storing instructions that, when executed by a processor of a device, cause the device to perform:

controlling a display screen to display a color according to a color display sequence, the color display sequence being predetermined and including at least two different colors;

capturing an image of a target object in a color display process of the display screen;

acquiring a color change sequence of a face of the target object in the image over time; and determining whether the target object is live based on a matching relationship between the color display sequence and the color change sequence, wherein when a portion of the color display sequence and a corresponding portion of the color change sequence are determined to include a same color sequence and a number of colors in the same color sequence compared to a number of colors in the color change sequence exceeds a preset percentage, it is determined that the color display sequence matches the color change sequence, wherein controlling the display screen to display the color according to the color display sequence comprises:

acquiring the color display sequence;

acquiring a brightness corresponding to each color in the color display sequence; and controlling the display screen to sequentially display a single color, at a brightness corresponding to the color, in the color display sequence and in an order of colors indicated by the color display sequence, a distance between two adjacent colors in the color display sequence in a three-dimensional color space being greater than a preset threshold.

* * * * *